United States Patent [19]

Ledebrink et al.

[11] Patent Number: 4,528,130
[45] Date of Patent: Jul. 9, 1985

[54] METHOD FOR DISSOLVING HARD-TO-DISSOLVE THORIUM AND/OR PLUTONIUM OXIDES

[75] Inventors: Friedrich-Wilhelm Ledebrink, Maintal; Wolfgang Rosenkranz, Waldsolms; Wolfgang Stoll, Hanau, all of Fed. Rep. of Germany

[73] Assignee: ALKEM GmbH, Hanau, Fed. Rep. of Germany

[21] Appl. No.: 311,072

[22] Filed: Oct. 13, 1981

[30] Foreign Application Priority Data

Oct. 14, 1980 [DE] Fed. Rep. of Germany ....... 3038807

[51] Int. Cl.³ .............................................. C09K 3/00
[52] U.S. Cl. .................................. 252/643; 252/637; 252/638; 423/20
[58] Field of Search ............... 252/643, 626, 637, 638; 423/20

[56] References Cited

U.S. PATENT DOCUMENTS

| 2,942,938 | 6/1960 | Facer et al. | 423/20 |
|---|---|---|---|
| 3,005,682 | 10/1961 | Wilson | 423/20 |
| 3,298,794 | 1/1967 | Mikesell, Jr. et al. | 422/242 |
| 3,488,162 | 1/1970 | Sierzputowski | 423/20 |
| 3,841,863 | 10/1974 | Caldwell et al. | 423/20 |
| 3,957,676 | 5/1976 | Cooley et al. | 252/626 |
| 4,098,866 | 7/1978 | Carnahan et al. | 423/20 |
| 4,124,525 | 11/1978 | Börner | 252/643 |
| 4,201,745 | 5/1980 | Zickgraf | 422/242 |
| 4,235,740 | 11/1980 | Druckenbrodt et al. | 252/643 |

FOREIGN PATENT DOCUMENTS

| 1071861 | 8/1958 | Fed. Rep. of Germany | 252/626 |
|---|---|---|---|
| 3013551 | 10/1980 | Fed. Rep. of Germany | 252/626 |
| 1565720 | 3/1968 | France | 423/20 |
| 2456545 | 1/1981 | France | 423/20 |

OTHER PUBLICATIONS

Sisco, F., (ed) et al., 1963, Columbium and Tantalum, John Wiley and Sons, Inc. New York, pp. 304-312, 579-596.

Fansteel Metallurgical Corporation, 1937, Tantalum: Acid-Proof Process Equipment, pp. 3-33.

Primary Examiner—Benjamin R. Padgett
Assistant Examiner—Howard J. Locker
Attorney, Agent, or Firm—Herbert L. Lerner; Laurence A. Greenberg

[57] ABSTRACT

Method for dissolving hard-to-dissolve thorium and/or plutonium oxides, especially dioxides such as ThO₂, PuO₂ or (U/Pu)O₂ mixed oxides by heating the oxides in a hermetically sealed vessel in fluoride-free nitric acid. The use of a gas atmosphere containing oxygen in the sealed vessel is advantageous.

13 Claims, 3 Drawing Figures

METHOD FOR DISSOLVING HARD-TO-DISSOLVE THORIUM AND/OR PLUTONIUM OXIDES

BACKGROUND OF THE INVENTION

1. Field of the Invention

The invention relates to a method for dissolving hard-to-dissolve thorium and/or plutonium oxides, especially dioxides such as $ThO_2$, $PuO_2$ or $(U/Pu)O_2$ mixed oxides.

2. Description of the Prior Art

Such a method is known from German Offenlegungsschrift No. 26 19 089, according to which plutonium dioxide ($PuO_2$) is dissolved in a boiling mixture of concentrated nitric acid ($HNO_3$) and hydrofluoric acid (HF). The dissolution rates increase with increasing concentration of the hydrofluoric acid. The dissolution takes place, for instance, in dissolving tanks of polytetrafluoroethylene.

With increasing hydrofluoric acid content, this mixture of concentrated nitric acid and hydrofluoric acid attacks not only the plutonium dioxide, but also the walls of the dissolving vessel. If dissolving tanks of metal are used, impurities consisting of corrosion products are additionally noted as a disadvantage in the further processing of the plutonium solution. Furthermore, the added fluorides must be separated again in an additional operation before the plutonium solution is processed further, since they not only stress the processing facilities corrosively, but also inhibit secondary chemical processes. In this connection, it is very difficult to separate the fluoride in thorium and plutonium complex compounds.

SUMMARY OF THE INVENTION

It is an object of the invention to provide a method for dissolving thorium and/or plutonium in a solvent which requires no hydrofluoric acid as a component, so that the mentioned difficulties are avoided.

With the foregoing and other objects in view, there is provided in accordance with the invention a method for dissolving hard-to-dissolve oxide selected from the group consisting of thorium oxide and plutonium oxide and mixtures thereof which comprises disposing said oxide together with fluoride-free nitric acid in a closed vessel, and heating the oxide and the nitric acid in the closed vessel to dissolve the oxide.

Other features which are considered as characteristic for the invention are set forth in the appended claims.

Although the invention is illustrated and described herein as embodied in a method for dissolving hard-to-dissolve thorium and/or plutonium oxides, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

The oxides are heated in a hermetically sealed vessel (autoclave) in fluoride-free nitric acid ($HNO_3$). Pure aqueous nitric acid can be used which contains, in particular, no hydrofluoric acid addition attacking the dissolving vessel and which is, therefore, free of fluoride. Because of the hermetic seal in the pressure and dissolving vessel (autoclave), this nitric acid can be heated to a higher temperature than its boiling temperature at normal pressure (atmospheric pressure), building up a higher pressure in the pressure and dissolving vessel, whereby the dissolving rate for the oxides is accelerated.

The oxides and the nitric acid are advantageously heated to a temperature of at least 120° C. and desirably, to a temperature in the range of 120° C. to 300° C. Preferably, the oxides and the nitric acid are heated to a temperature in the range of 200° C. to 300° C.

Advantageously, the oxides are heated in concentrated, fluoride-free nitric acid, since, thereby, particularly high dissolving rates are obtained.

Figure 1:
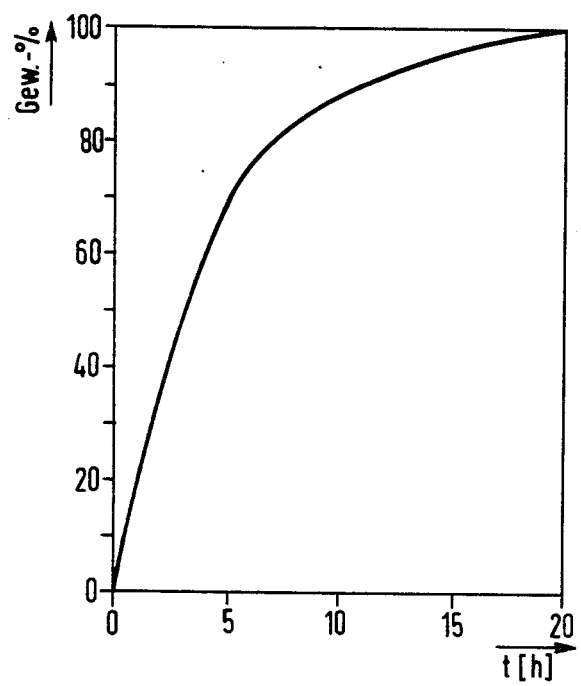
FIG. 1 is a diagram in which the dissolved amount of $PuO_2$ is plotted versus the dissolving time in hours for a test in which hard-to-dissolve $PuO_2$ is dissolved in nitric acid in accordance with the invention.
Figure 2:
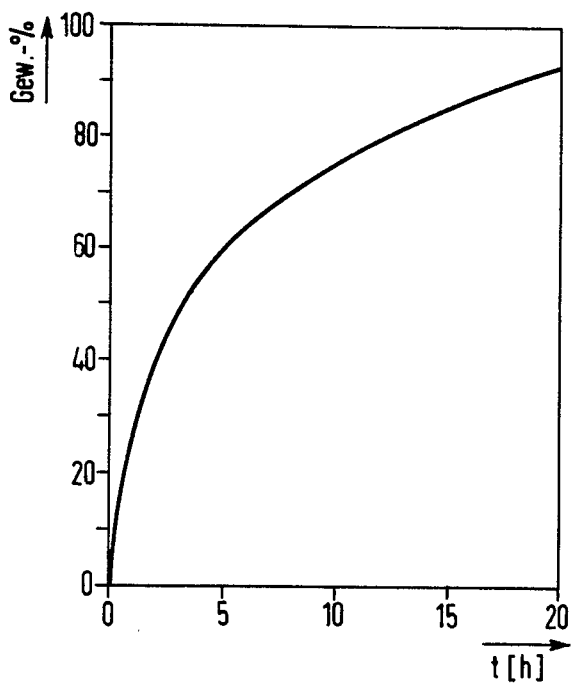
FIG. 2 is a diagram similar to FIG. 1 for a test in accordance with the invention in which thorium dioxide is dissolved in concentrated nitric acid.

The invention and its advantages will be explained in greater detail by way of embodiment examples, referring to the drawings: FIGS. 1 and 2 show in diagram form the dissolution rates for one embodiment example each of the invention.

Figure 3:
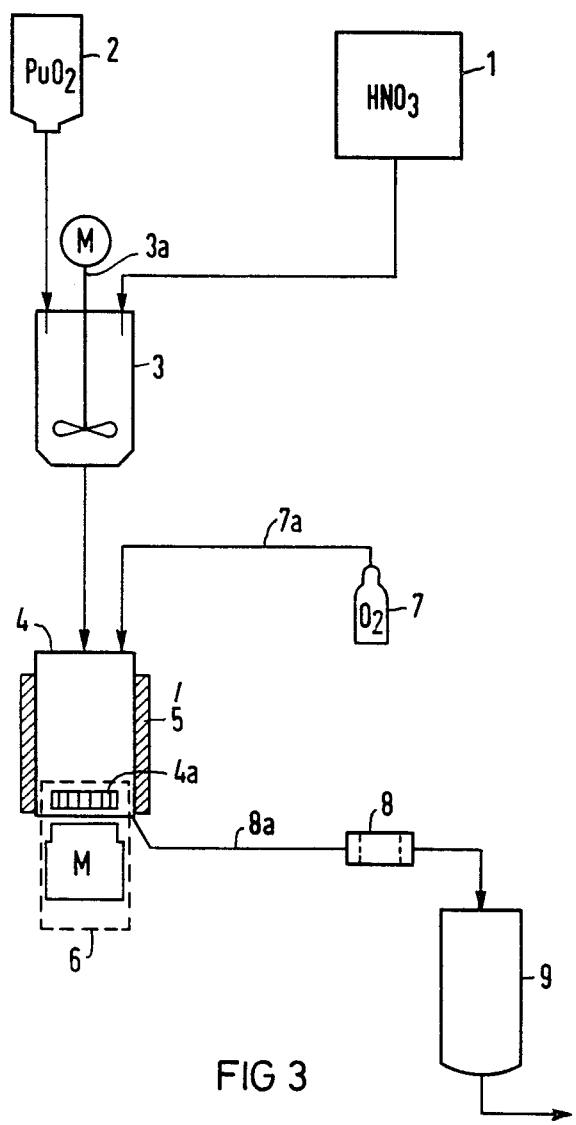
FIG. 3 diagrammatically illustrates apparatus for carrying out the method of the invention and shows a suspension tank equipped with a stirrer, into which is fed the raw oxide and nitric acid. The suspension of oxide in acid is fed into an autoclave equipped with a magnetic stirrer and heating jacket and also has means for receiving oxygen to provide an oxygen atmosphere. The autoclave is sealed and heated to dissolve the oxide and the solution passed through a filter and then into a receiving tank.

FIG. 3 shows, schematically, dissolving apparatus for a third embodiment example of the invention.

In a pressure and dissolving vessel (autoclave) are contained 30 ml pure, fluoride-free concentrated nitric acid, to which 4 g plutonium dioxide $PuO_2$ are added. Then the pressure and dissolving vessel (autoclave) is hermetically sealed and the electric autoclave heater is switched on. A temperature control maintains a temperature of the concentrated nitric acid at 220° C. in the pressure and dissolving vessel for a period of 20 hours, so that a vapor pressure of the nitric acid of 20 bar appears in the pressure and dissolving vessel.

As shown in the diagram according to FIG. 1, in which the dissolved amount of $PuO_2$ in percent by weight is plotted versus the dissolving time in hours, the charged-in plutonium dioxide is completely dissolved during this time of 20 hours. After a dissolving time of 10 hours, about 90% of the charge-in amount of plutonium dioxide have already gone into solution.

According to a second embodiment example, 30 ml pure fluoride-free concentrated nitric acid which is contained in the pressure and dissolving vessel (autoclave) are reacted with 4 g thorium dioxide $ThO_2$. Then, the pressure and dissolving vessel (autoclave) is hermetically sealed and the electric autoclave heater is switched on. A temperature control at the autoclave maintains a temperature of 200° C. of the nitric acid in the pressure and dissolving vessel (autoclave) for a period of 20 hours. Accordingly, a vapor pressure of the nitric acid of 10 bar adjusts itself in this pressure and dissolving vessel.

As shown in the diagram according to FIG. 2, in which the dissolved amount of $ThO_2$ is plotted in percent by weight versus the dissolving time in hours, about 75% of the charged-in amount of thorium dioxide have gone into solution after 10 hours, and more than 90% after 20 hours.

Apparatus for dissolving a larger quantity of plutonium dioxide according to a method as per the invention is shown schematically in FIG. 3. The apparatus, according to FIG. 3, comprises a nitric acid feed tank 1 and a feed tank 2 for plutonium dioxide powder. Both tanks 1 and 2 are provided with pipes to a suspension tank 3, in which an electric stirrer 3a is arranged. The suspension tank 3 is provided with a feed line to a pressure and dissolving tank (autoclave) 4 with a capacity of about 5 l. To the autoclave 4, an electric heating jacket 5 is attached as well as an electric stirrer 6. This stirrer 6 has a rotatable magnet which is mounted outside the pressure and dissolving vessel (autoclave) 4 and is driven by an electric motor. In the pressure and dissolving vessel (autoclave) 4 there is a stirrer 4a with a magnetic body which is provided with a coating insensitive to nitric acid, for instance, polytetrafluoroehtylene. The rotatable magnet outside the autoclave takes the magnetic body in the stirrer 4a along, so that the latter is driven without a mechanical shaft.

The autoclave 4 is further associated with a pressure bottle 7 filled with oxygen, from which oxygen gas can be fed into the pressure and dissolving vessel (autoclave) 4 via a feed line 7a.

The autoclave 4 has a pipe 8a for discharging the solution from the pressure and dissolving vessel 4. This pipe 8a leads via a filter 8 to a receiving tank 9 into which the solution is stored for further use.

At the autoclave 4 are further attached conventional measuring devices, not shown, for pressure and temperature, a control device, not shown, for the temperature as well as shut-off valves for the pipelines and a pressure-relief valve.

Four liters per 14.5-mol aqueous fluoride-free nitric acid are first fed into the suspension tank 3 from the nitric acid feed tank 1. After the stirrer 3a is switched on, 1 kg plutonium dioxide $PuO_2$ in powder form is gradually charged into the suspension tank 3 from the feed tank 2. Then, the suspension is drained from the suspension tank 3 into the pressure and dissolving vessel (autoclave) 4 which has a capacity of 5 liters.

The pressure and dissolving vessel (autoclave) 4 is first flushed with pure oxygen from the pressure bottle 7 through line 7a. Thereafter, this pressure and dissolving vessel 4 is sealed gastight and an oxygen atmosphere with a pressure of 21 bar is advantageously admitted thereto from the pressure bottle 7. The shut-off valve in the pipeline 7a is closed.

Subsequently, the stirrer 6 and the heating jacket 5 are switched on. The stirrer 6 prevents the plutonium dioxide powder from settling during the dissolving process in the pressure and dissolving vessel (autoclave) 4.

The nitric acid in the pressure and dissolving vessel (autoclave) 4 is heated to 220° C. This temperature is held constant for 20 hours by means of the temperature control. At this temperature, a pressure of 64 bar adjusts itself initially in the pressure and dissolving vessel 4.

By virtue of the oxygen atmospheres in the pressure and dissolving vessel (autoclave) 4, the quadrivalent plutonium Pu (IV) is oxidized advantageously, concurrently with the dissolution of the plutonium dioxide, to hexavalent plutonium Pu (VI) according to the molecular formula $$3PuO_2 + 6HNO_3 + 1.5O_2 \rightarrow 3PuO_2(NO_3)_2 + 3H_2O \quad (A).$$

Nitrous gases are formed at an intermediate stage during this oxidation of the plutonium. These gases, however, are immediately oxidized with oxygen to $HNO_3$ at the prevailing pressure, which is above atmospheric pressure (760 mm Hg), according to the following reaction equations:

$$3PuO_2 + 10HNO_3 \rightarrow 3PuO_2(NO_3)_2 + 5H_2O + 3NO_2 + NO$$

$$3NO_2 + NO + 1.5O_2 + 2H_2O \rightarrow 4HNO_3.$$

During this reaction, oxygen is consumed so that, after the charged-in plutonium is completely oxidized, a pressure drop to about 20 bar finally occurs after 20 hours in the hermetically sealed pressure and dissolving vessel (autoclave) 4.

To carry out this reaction advantageously, the pressure and dissolving vessel (autoclave) 4 can also be filled-up with ozone or a mixture of ozone ($O_3$) and oxygen ($O_2$). Advantageously, these gases have a pressure higher than normal pressure (atmospheric pressure). Advantageously, the gas introduced in the pressure and dissolving vessel 4 is a gas with an oxygen content in the form of molecular oxygen and/or ozone which is higher than the oxygen content of the ambient air. Air on a moisture free basis contains about 20.99% by volume and 23.2% by weight of oxygen.

At the end of the dissolving time, the pressure on the pressure and dissolving vessel (autoclave) 4 is released and the plutonyl-nitrate solution contained in this pressure and dissolving vessel 4 is transferred via pipeline 8a through filter 8 into the receiving or supply tank 9. The plutonyl-nitrate solution from the supply tank 9 can be mixed, for instance, in accordance with German Offenlegungsschrift No. 28 11 949 with a uranyl-nitrate solution and, subsequently, be placed in a 20% ammonium-carbonate solution in order to precipitate an ammonium-uranyl-plutonyl carbonate mixed crystal which can advantageously be processed into sintered nuclear fuel bodies for nuclear reactor fuel assemblies.

In the course of time, the chemical equilibrium of the plutonyl-nitrate solution in the supply tank 9 shifts again in favor of the left side of the molecular reaction equation (A). Therefore, it is advantageous, prior to further processing, that a plutonyl-nitrate solution which has been stored for an extended period of time, be re-oxidized once more in a pressure and dissolving vessel (autoclave) closed off gastight, preferably in an oxygen and/or ozone atmosphere at a pressure higher than normal pressure (atmospheric pressure) while being heated to a temperature equal to or higher than the boiling temperature of nitric acid at normal pressure (atmospheric pressure), to cause the chemical equilibrium to shift again in favor of the right side of the molecular reaction equation (A) and to optimize the further processing of the solution, for instance, to ammonium-uranyl-plutonyl carbonate.

The pressure and dissolving vessel (autoclave) 4 may be made of alloy steel coated on the inside, at least those parts which come into contact with the solvent nitric acid, with tantalum. Instead of tantalum, the pressure and dissolving vessel can also be coated with gold, platinum or polytetrafluoroethylene, so that the alloy steel which has a high corrosion rate in nitric acid at elevated temperature, is not attacked by the latter. The pressure and dissolving vessel itself can also consist of tantalum, gold, platinum or polytetrafluoroethylene.

In apparatus according to FIG. 3, plutonium dioxide from irradiated nuclear fuel of burned-up nuclear fuel assemblies can also be dissolved-out advantageously in accordance with the method of the invention. For this purpose, the feed tank 2 can be filled with irradiated nuclear fuel in powder form instead of with $PuO_2$ in powder form.

We claim:

1. Method for dissolving hard-to-dissolve oxide selected from the group consisting of plutonium oxide and mixtures of plutonium oxide and thorium oxide and plutonium oxide and uranium oxide which comprises introducing said oxide together with fluoride-free nitric acid in a closed vessel, and in the absence of added hydrofluoric acid or fluoride heating the oxide and the nitric acid in the closed vessel to a temperature higher than the boiling temperature of nitric acid at normal pressure and maintaining the temperature higher than the boiling temperature of nitric acid at normal pressure for a time sufficient to dissolve the oxide.

2. Method for dissolving hard-to-dissolve oxide selected from the group consisting of plutonium oxide and mixtures of plutonium oxide and thorium oxide and plutonium oxide and uranium oxide which comprises introducing said oxide together with fluoride-free nitric acid in a closed vessel, and in the absence of added hydrofluoric acid or fluoride heating the oxide and the nitric acid in the closed vessel to a temperature of at least 120° C. and maintaining the temperature at least 120° C. for a time sufficient to dissolve oxide.

3. Method for dissolving hard-to-dissolve oxide selected from the group consisting of plutonium oxide and mixtures of plutonium oxide and thorium oxide and plutonium oxide and uranium oxide which comprises introducing said oxide together with fluoride-free nitric acid in a closed vessel, and in the absence of added hydrofluoric acid or fluoride heating the oxide and the nitric acid in the closed vessel to a temperature in the range of 120° C. to 300° C. and maintaining the temperature in said range for a time sufficient to dissolve the oxide.

4. Method according to claim 1 or 2 or 3, wherein the oxide is plutonium oxide.

5. Method according to claim 1 or 2 or 3, wherein the oxide is a mixture of plutonium oxide and thorium oxide.

6. Method according to claim 1 or 2 or 3, wherein the oxide is a dioxide selected from the group consisting of $PuO_2$ and mixed oxides.

7. Method according to claim 1 or 2 or 3, wherein the oxide is a mixed oxide having the formula $(U/Pu)O_2$.

8. Method according to claim 1 or 2 or 3, wherein the nitric acid in which the oxides are heated is concentrated nitric acid.

9. Method according to claim 1 or 2 or 3, wherein the oxides and the nitric acid are heated in the closed vessel in a gas atmosphere which has an oxygen content in the form of molecular oxygen, ozone or mixtures thereof greater than the oxygen content of atmospheric air.

10. Method according to claim 1 or 2 or 3, wherein the oxides and the nitric acid are heated in the closed vessel in a gas atmosphere which consists of pure molecular oxygen or ozone or a mixture thereof.

11. Method according to claim 1 or 2 or 3, wherein the oxides and the nitric acid are heated in the closed vessel in a gas atmosphere which has an oxygen content in the form of molecular oxygen, ozone or mixtures thereof greater than the oxygen content of atmospheric air and, wherein the pressure of the oxygen in the closed vessel is higher than normal pressure.

12. Method according to claim 1, wherein the dissolved oxide in solution is stored, and wherein said dissolved oxide in solution deteriorates in storage, and wherein deteriorated dissolved oxide in solution is subjected in a closed vessel to heating at a temperature above the temperature of nitric acid (normal pressure) to revert the deteriorated solution to its former state.

13. Method according to claim 1, wherein the dissolved oxide in solution is stored, and wherein said dissolves oxide in solution deteriorates in storage, and wherein deteriorated dissolved oxide in solution is subjected in a closed vessel to heating at a temperature above the temperature of nitric acid (normal pressure) to revert the deteriorated solution to its former state wherein an oxygen atmosphere at a pressure higher than normal pressure is introduced into said closed vessel.

* * * * *